United States Patent
Carlsson et al.

(10) Patent No.: US 6,345,929 B1
(45) Date of Patent: Feb. 12, 2002

(54) DEVICE FOR THE ANCHORAGE OF AN AXLE

(75) Inventors: Anders Carlsson; Evert Svensson, both of Atvidaberg (SE)

(73) Assignee: Svenska Expander AB, Atvidaberg (SE)

( * ) Notice: Subject to any disclaimer, the term of this patent is extended or adjusted under 35 U.S.C. 154(b) by 0 days.

(21) Appl. No.: 09/587,158

(22) Filed: Jun. 5, 2000

Related U.S. Application Data

(63) Continuation of application No. PCT/SE98/02271, filed on Dec. 10, 1998.

(51) Int. Cl.[7] .............................. B25G 3/02; F16B 3/02; F16D 1/00
(52) U.S. Cl. .................. 403/368; 403/369; 403/370
(58) Field of Search ............................... 403/366, 367, 403/368, 369, 370

(56) References Cited

U.S. PATENT DOCUMENTS

| | | | |
|---|---|---|---|
| 1,493,063 A | | 5/1924 | Blaine ........................ 403/370 |
| 3,590,652 A | * | 7/1971 | Strang ........................ 74/421 |
| 4,507,005 A | * | 3/1985 | Siewert et al. ................ 403/16 |
| 5,190,393 A | * | 3/1993 | Svenson ...................... 403/370 |
| 5,263,802 A | * | 11/1993 | Fichot et al. .................. 411/26 |
| 5,538,356 A | | 7/1996 | Aarre et al. ................. 403/371 |
| 5,551,794 A | * | 9/1996 | Aaare et al. ................ 403/374 |

* cited by examiner

Primary Examiner—Lynne H. Browne
Assistant Examiner—John B. Walsh
(74) Attorney, Agent, or Firm—Altera Law Group, LLC

(57) ABSTRACT

A device for an anchorage of an axle at each of its ends, preferably in a pair of fixing lugs formed with through holes for the axle. The device is characterised in that at each end of the axle there is at least one plane chamfer. The chamfer forms an angle a with the longitudinal axis of the axle and is connected to the outer surface of the axle, leaving a cylindrical axle section between the plane chamfers. The device at each plane chamfer includes a body, with a first section having an angle substantially similar to the plane chamfered part of each axle end, together with a second section, extending axially, and a segmental-shaped end, which along its curve has a flange that is directed radially outwards past the periphery of the axle. The is designed to act as a wedge with points directed towards the cylindrical centre section. An anchor element having a movement can be imparted to the body in an axial direction towards the cylindrical section, thereby producing an anchorage of the axle in each hole.

9 Claims, 6 Drawing Sheets

DEVICE FOR THE ANCHORAGE OF AN AXLE

This application is a Con of PCT/SE98/02271 filed Dec. 10, 1998.

The present invention relates to a device for the anchorage of an axle at each of its ends, preferably in a pair of fixing lugs or the like, formed with through-holes for the axle, as specified in the pre-characterising part of claim 1.

A known solution according to U.S. Pat. No. 1,493,063 which, however, relates to another application, shows how an axle is divided diagonally at one end so as to form two parts, displaceable in relation to one another. The outer end part is provided with an enlarged axial bore and the inner end part with a tapped bore. A bolt is inserted with clearance through the outer end part so that it interacts with the thread in the inner axle part. When the screw connection is tightened, the outer end part at the dividing line is pressed up to the inner axle part, the parts thereby being wedged together with a surrounding part.

Another known solution according to U.S. Pat. No. 5,538,356 shows an axle which, at its ends, is provided with a tapered section and a central threaded section. The tapered section has alternately tapered and plane surfaces. A uniting collar of alternating internally tapered and plane wedge elements is placed around the tapered section and by means of a nut on the threaded section a movement can be imparted to the tapered section, as a result of which the axle end can be fixed together with a surrounding part.

A disadvantage with the solution according to U.S. Pat. No. 1,493,063 is that the axial bore in the outer end part has to be enlarged in order to permit the movement in a radial direction of the outer end part that is required for it to function. A further disadvantage to this solution is that, if the bolt is screwed up somewhat, so that the wedge connection ceases to act, the axle end can slip out of the surrounding part in an axial direction. This solution also means that the strength at the axle end is adversely affected. Due to the wedge angle required, the solution can only be used where the surrounding part has an elongated fixing aperture and the axle has a relatively small diameter.

Due to the internally tapered wedge elements forming part of the collar, the second solution according to U.S. Pat. No. 5,538,356 has to be tightened up by means of a tightening tool, since mechanical deformation of the said elements is bound to occur if they are forced up on to a section with a different radius of curvature. Furthermore the internally tapered wedge elements will mean that play occurs between the elements of the collar and the axle, since the above-mentioned deformation never permits full contact between the parts, which means that this connection will have to be re-tightened at regular intervals. Tightening also has to be done at both ends of the axle simultaneously, that is to say the axle has to be braced in order to prevent the axle rotating when tightening is carried out. With this solution also, the strength at the axle end is adversely affected. This solution also means a relatively large axial projection beyond a fixing lug, which means that the axle can easily be damaged so that its fixing is broken. Finally it may be noted that this solution probably has very high manufacturing costs.

An object of the present invention is to produce a device of the type initially referred to, which gives the axle ends good strength, which will enable an axle to be anchored at each of its ends in a pair of fixing lugs or the like, formed with through-holes for the axle, the said device allowing easy manual tightening of one side at a time without bracing, and being incapable of accidental removal from the axle when this is placed in the fixing lugs, the said device furthermore being easy and cheap both to manufacture and maintain, and resulting in such extensive free surfaces at the axle ends that necessary text marking can be applied there giving good legibility. The object has been achieved by a device having the characteristics specified in claim 1.

Preferred embodiments of the device moreover have any or some of the characteristics specified in the subordinate claims.

The device according to the invention has various advantages:

Due to the fact that no mechanical deformation of the constituent parts is required during assembly, tightening can be carried out manually without special tightening tools.

Because of the plane slide surface between the axle and the body, full contact is obtained between the body and the axle throughout the tightening process.

The full contact also means greater freedom to choose greater wedge angles, which will facilitate any subsequent dismantling.

The flanges at the segmental-shaped end surfaces of the bodies will function as a physical stop and prevent the axle falling out of the fixing lugs.

In any subsequent dismantling the lip on one side will rest against the fixing lug and be forced to separate from the axle. The lip also provides the facility for using a pull-off tool that grips around this when dismantling.

The lip furthermore means that additional locking devices on the end surfaces or fixing lugs become superfluous, which minimises the axial projection at the sides and reduces the costs.

Other factors which have a positive influence on the cost of the device according to the invention include the fact that the device has few constituent parts and these are simple to manufacture and provides good flexibility.

The invention will be explained in more detail below with the aid of examples of embodiments of the present invention and with reference to the drawings attached in which.

The same reference numbers are used for identical or similar parts when describing all the figures.

Figure 1:
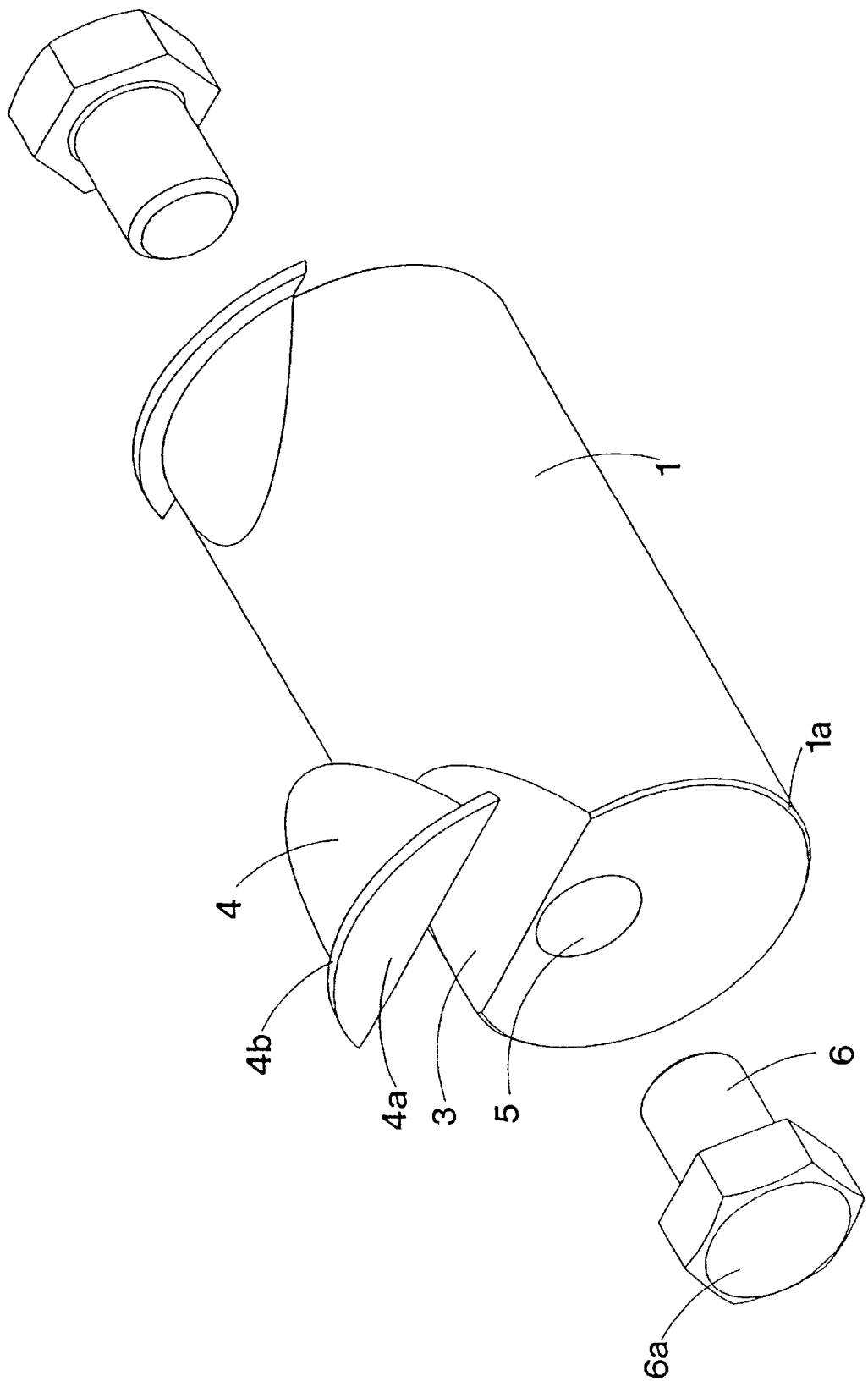
FIG. 1 shows an exploded view of a first embodiment of the device according to the invention in which the various parts can be seen.

FIG. 1 shows a first embodiment of a device according to the invention in a cylindrical axle 1. The axle 1 is designed to be anchored at its ends, preferably in a pair of fixing lugs 2 or the like, formed with through-holes for the axle (see FIG. 2). At each end of the axle is a guide bevel 1a, which facilitates insertion of the axle into the fixing lugs 2. At each end of the axle there is also a chamfer 3, which is designed so that a plane slide surface with an essentially elliptical segmental shape is located between a chord at the axle end and the outer surface of the axle. The slide surface forms an angle a with the longitudinal axis of the axle. Between the plane chamfers 3 at the ends of the axle is a cylindrical axle section. When the axle 1 is placed in the hole of the fixing lugs bodies 4, having a form that corresponds to the plane chamfered part of each axle end and a section extended axially adjacent to the guide bevel 1*a* and terminated by a segmental-shaped end 4*a*, can be inserted into the said lugs. On the curve of the segmental-shaped end is a flange 4*b*, directed radially outwards past the periphery of the axle, which is designed to function as a stop and prevent the axle leaving the fixing lugs in an axial direction after it has been fitted. The bodies 4 are designed to act as wedges with points directed towards the cylindrical centre section of the axle. At the axle end immediately below each chamfer is a tapped axial bore 5. A bolt 6 is designed to interact with the tapped bore 5 so that, when the bolt is screwed in towards the axle end, the head 6*a* of the bolt will press against the segmental-shaped end surface 4*a* of the body, thereby imparting to the body 4 a movement in an axial direction towards the cylindrical section. The body will then move up the plane slide surface at the end of the axle so that the latter is thereby anchored in the fixing lug 2 by means of the wedging action.

Figure 2:
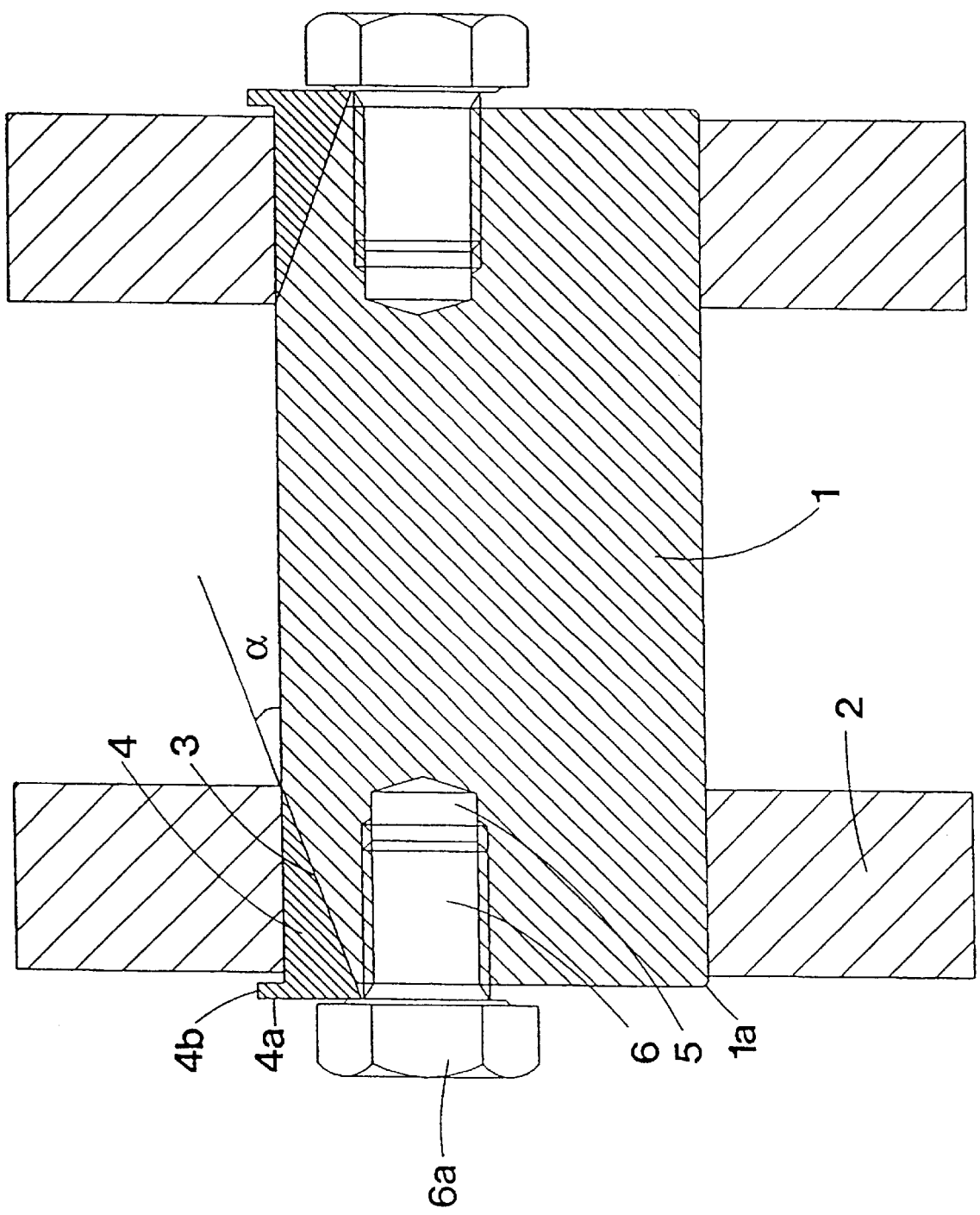
FIG. 2 shows a section through an axle which is provided with a device according to the invention as in FIG. 1.

FIG. 2 shows a section through the axle 1, which is provided with the device according to the invention and located in a pair of fixing lugs 2, formed with through-holes for the axle. Since the device is the same at each end of the axle, only the one axle end will be described. At the end of the axle is the guide bevel 1*a* and the chamfer 3, which leaves the plane slide surface. The slide surface forms an angle a with the longitudinal axis of the axle. Between the plane chamfers at each end of the axle is the cylindrical axle section. After placing the axle in the fixing lug holes a body 4 has been inserted into each hole, the axial extent of which body towards the cylindrical section of the axle is less than the axial extent of the fixing lug in the same direction. In cross-section, the body 4 presents a wedge shape that corresponds to the plane chamfered part of each axle end, together with a section, extended axially adjacent to the guide bevel 1*a* at the axle end and terminated by the flange 4*b*, directed radially outwards past the periphery of the axle. When the device is fitted in this way the flange 4*b* will function as a stop and prevent the axle 1 leaving the fixing lugs 2 in an axial direction. At the axle end, below each chamfer 3 is the tapped axial bore 5. The bolt 6 interacts with the tapped bore 5 so that, when the bolt is screwed in towards the axle end, the head 6*a* of the bolt will press against the end 4*a* of the body and press this up the smooth slide surface, so that the axle end is thereby anchored in the fixing lug 2 by means of the wedging action.

Figure 3:
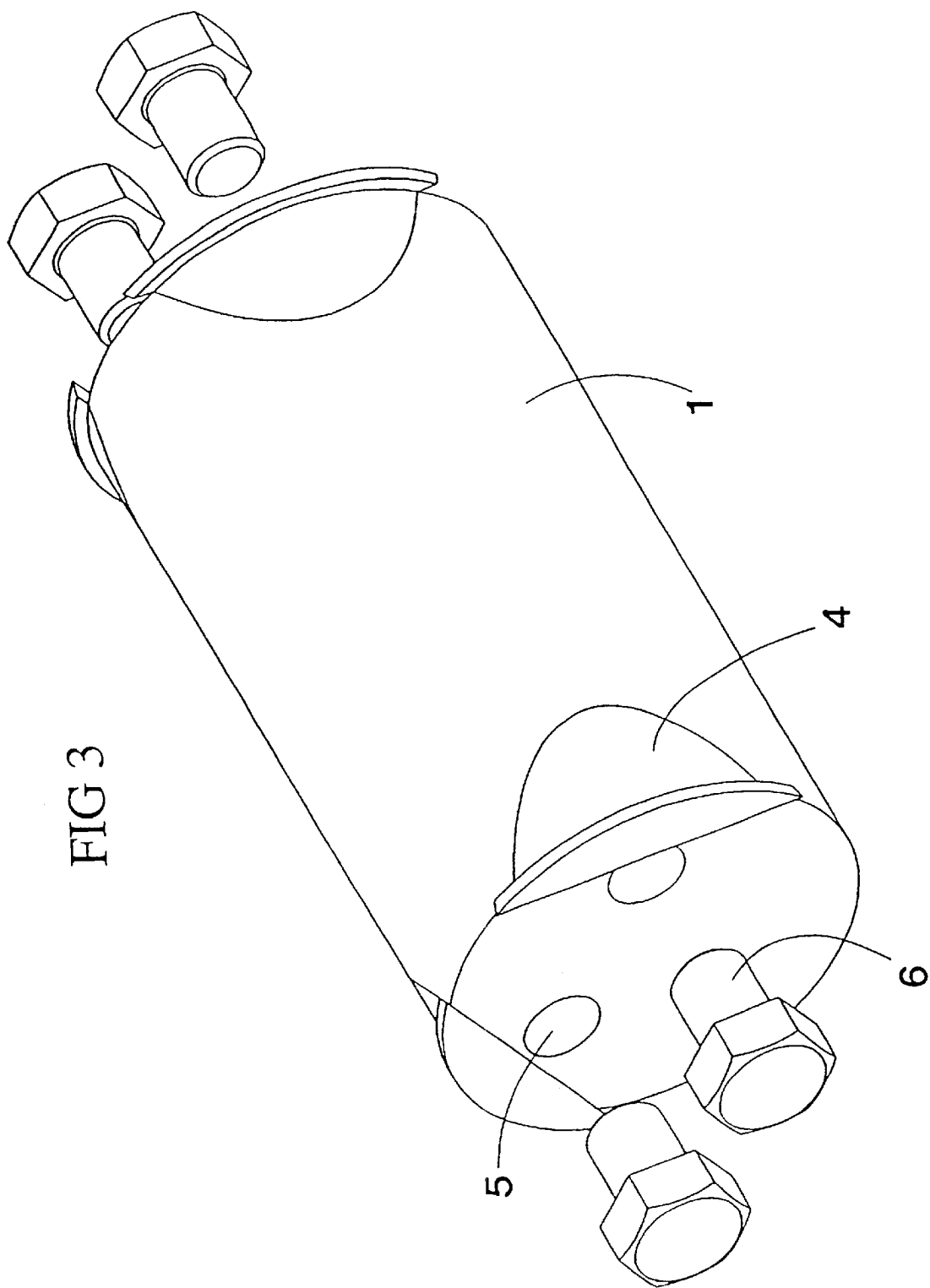
FIG. 3 shows an exploded view of an alternative embodiment of the device according to the invention in which two wedge elements are arranged with a 120° angle between them.

FIG. 3 shows how a plurality of bodies 4 can be arranged at each end of the axle in the case of large axle diameters. The said bodies are then arranged in the same way as described in connection with FIG. 1 and FIG. 2. The figure shows how two bodies 4 are arranged at each end of the axle with an angle of 120° between them, so that the locking force is equally distributed around the circumference of the axle end.

Figure 4:
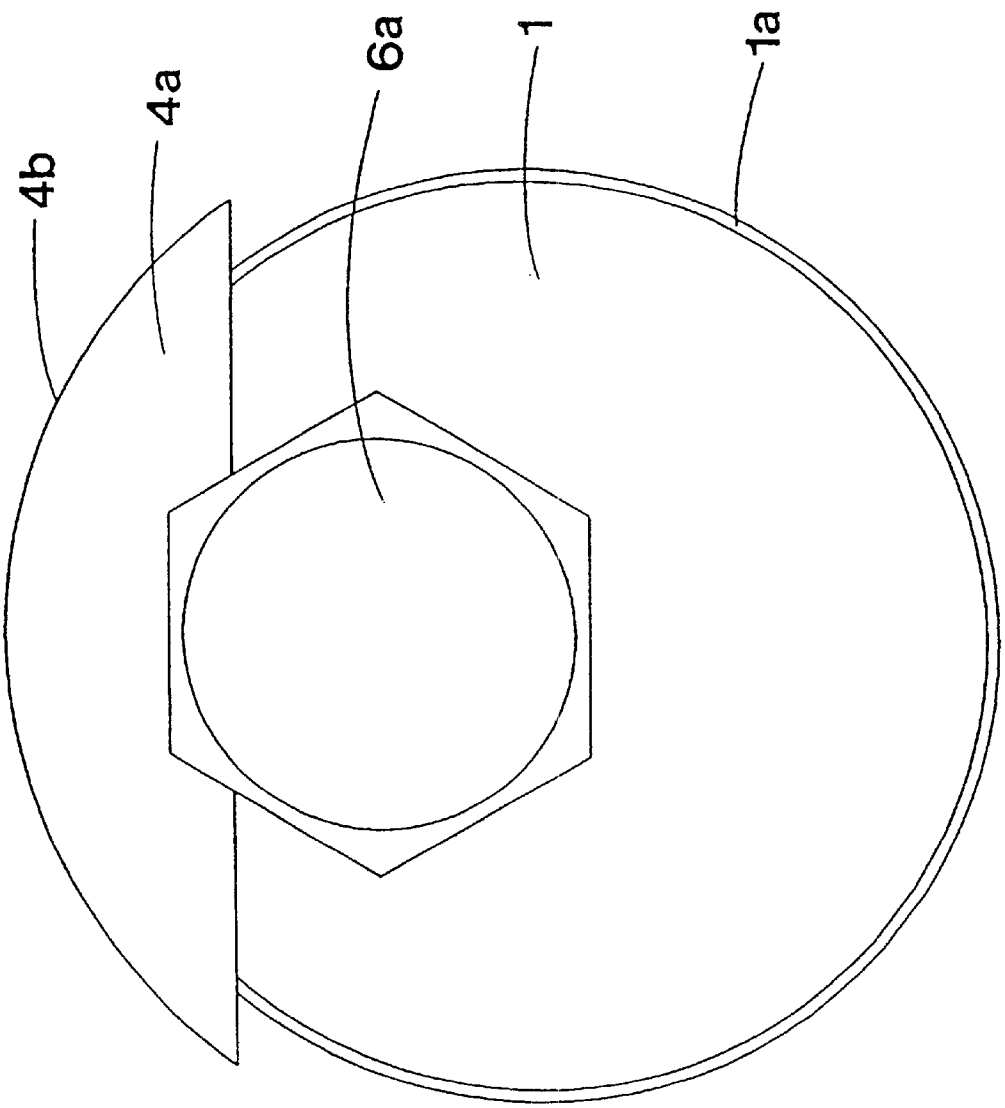
FIG. 4 shows an end view of the device according to FIG. 1 or FIG. 2.

FIG. 4 shows an end view of the device according to FIGS. 1 and 2. The segmental-shaped end 4*a* can be seen from this. At the segmental-shaped end 4*a* is the curve with the flange 4*b*, directed radially outwards past the periphery of the axle and designed to function as a stop, preventing the axle from leaving the fixing lugs 2 in an axial direction. It can also be seen here how, at the end of the axle, immediately below the chord of each chamfer, there is the bolt 6 interacting with the tapped axial bore 5, the head 6*a* of which bolt, when the bolt 6 is screwed in towards the axle end, will press against the segmental-shaped end surface 4*a* of the body, thereby imparting to the body 4 a movement in an axial direction towards the cylindrical section, so that the axle end can be fixed at the fixing lug hole.

Figure 5:
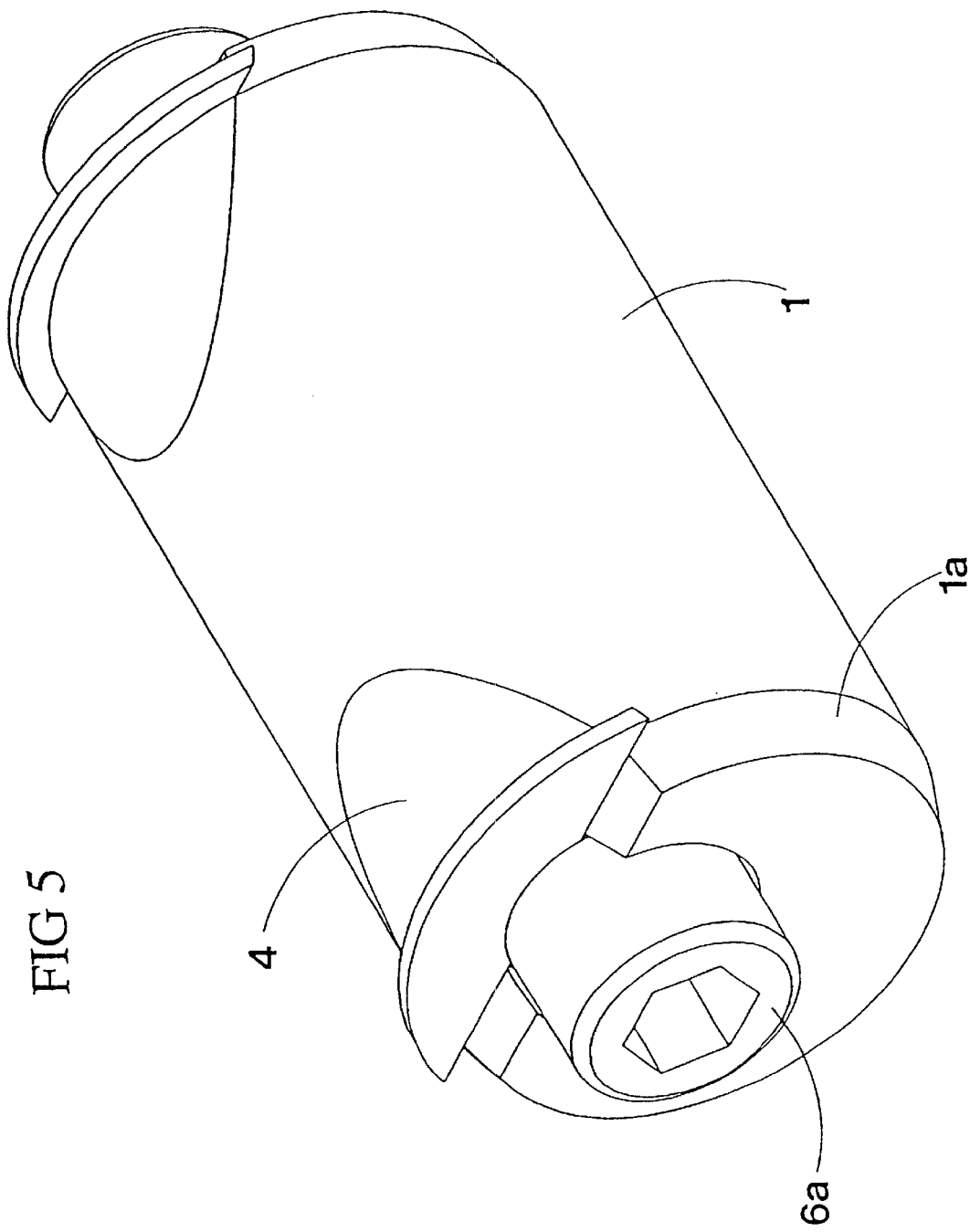
FIG. 5 shows an embodiment with a projecting section surrounded by the guide bevel, in which the bolt head is sunk, for additional protection against external effects.

FIG. 5 shows an alternative embodiment in which a projecting section, surrounded by the guide bevel 1*a* formed on the circumference, is arranged at the end of the axle, in which section the head 6*a* of the bolt 6, here shown as a hexagon socket bolt, is sunk. This design gives the bolt 6 additional protection against external effects.

Figure 6:
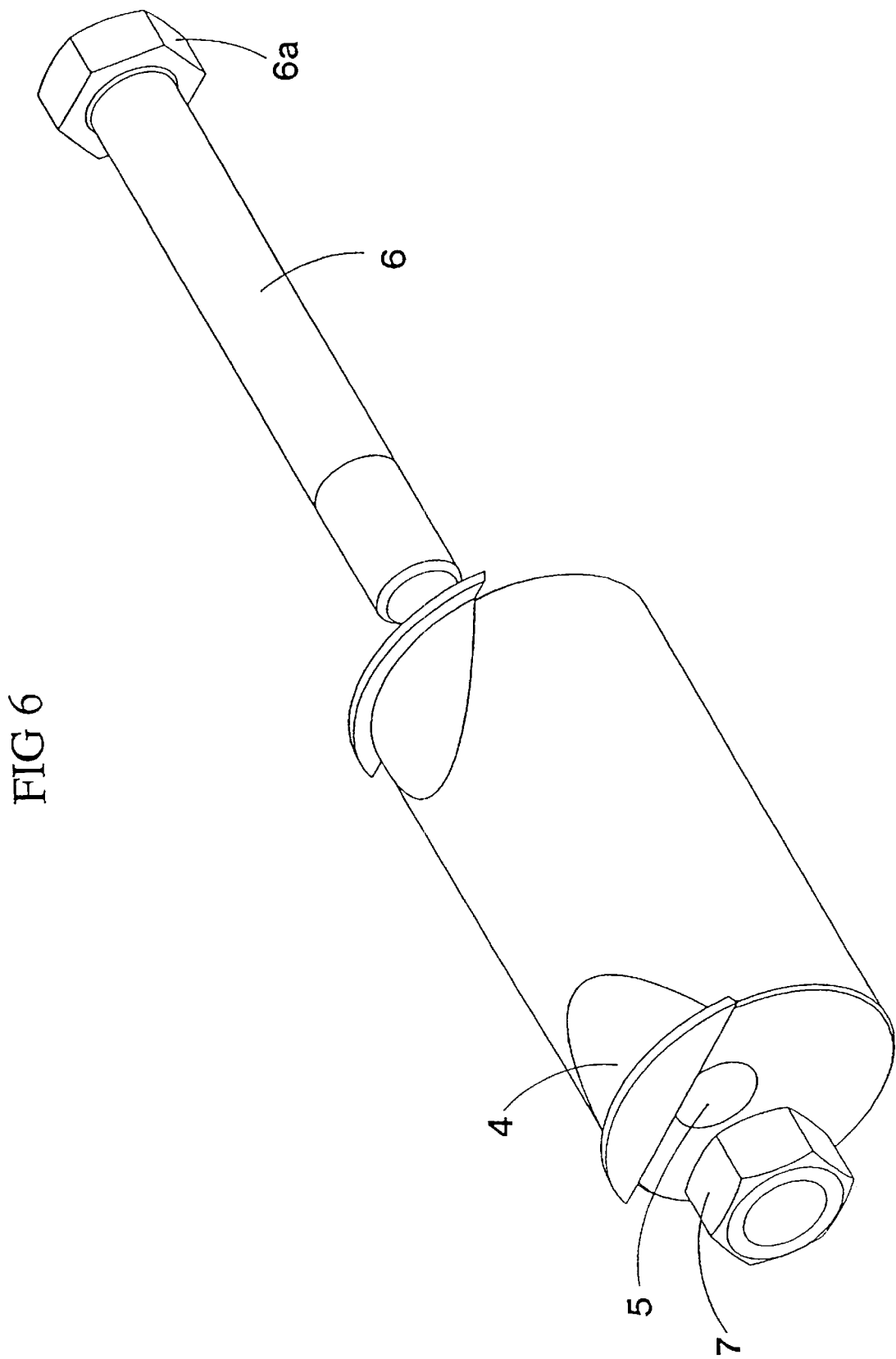
FIG. 6 shows an exploded view of an embodiment with an axial bore made through the entire length of the axle, and a bolt arranged in the said bore for acting on the bodies at both ends of the axle.

FIG. 6 shows how the axle can be provided with an axial bore 5, made through the entire length of the axle and ending at each end of the axle immediately below each plane chamfer 3. Extending through this is a bolt 6, which at a first end has a head 6*a*, which bears against the essentially segmental-shaped end 4*a* of the one body and at the other end has a nut 7, interacting with a thread on the bolt, the said nut bearing against essentially segmental-shaped end 4*a* of the second body. In this way the bodies 4 are designed to have a movement imparted to them in an axial direction towards the cylindrical section when a torsional tightening movement is imparted to the bolt connection. This design may have advantages particularly where it is desirable to be able to tighten the bolt connection from one side. Alternatively, the bolt 6 may be a stud bolt which interacts with two nuts 7, each bearing against the respective, essentially segmental-shaped ends 4*a* of the bodies.

It will be obvious to a person skilled in the art that the invention is not confined to the embodiments described above, but may rather lend itself to modifications within the framework of the idea of the invention defined in the claims below. The device may, for example, be made so that the bore 5 partly ends at the essentially segmental-shaped ends 4*a* of the bodies, so as to provide the bolt heads or nuts with a larger bearing surface against this.

What is claimed is:

1. A device for the anchorage of an axle, the device comprising;
    a fixing lug at each end of an axle, the fixing lug is formed with a through hole for the axle,
    at least one plane chamfer at each end of the axle which forms an angle with the longitudinal axis of the axle, wherein a cylindrical axle section remains between the at least one plane chamfer at each end of the axle,
    a body, with a a first section having an angle substantially similar to the plane chamfered part of each axle end, a second section extended axially, and a segmental-shaped end having a flange directed radially outwards past the periphery of the axle along a curve of the segmental-shaped end, wherein the body being designed to act as a wedge between an axle end and a fixing lug, and
    an anchor element for applying pressure on the body to anchor the axle in the through hole, wherein the anchor element engages an axial bore of the axle.

2. The device according to claim 1, wherein the angle is at an interval of 10–30°.

3. The device according to claim 1, wherein the body is made of a harder material than the axle.

4. The device according to claim 1, wherein there are two plane chamfers at each end of the axle with a 120° angle between them and that there is a body with associated anchor element for each plane chamfer.

5. The device according to claim 1, wherein the anchor element is designed to act between the body and the respective end of the axle.

6. The device according to claim 5, wherein at each end of the axle, immediately below the at least one plane chamfer, a tapped axial bore is provided as the anchor element together with a bolt, which is designed to interact with the tapped axial bore, the bolt having a head, which bears against the essentially segmental-shaped end of the body and is designed to impart on the body a movement in an axial direction towards the cylindrical section when a torsional movement is imparted to the bolt.

7. The device according to claim 1, wherein an axial bore, made through the entire length of the axle and ending at each end of the axle immediately below the at least one plane chamfer, and a bolt extending through the axial bore is provided as an anchor element, wherein the bolt at a first end having a head, which bears against the essentially segmental-shaped end of a first body and at the other end of the bolt there is a nut, interacting with a thread on the bolt, the said nut bearing against the essentially segmental-shaped end of a second body, the bodies being designed to have a movement imparted to them in an axial direction towards the cylindrical section when a torsional tightening movement is imparted to the bolt connection.

8. The device according to claim 1, wherein an axial bore, made through the entire length of the axle and ending at each end of the axle immediately below the at least one plane chamfer and a stud bolt extending through the axial bore is provided as an anchor element, a first nut, interacting with a thread on the stud bolt, being provided at a first end of the stud bolt and bearing against the essentially segmental-shaped end of the a first body, and a second nut, interacting with a thread on the stud bolt, being provided at the other end of the stud bolt, the said second nut bearing against the essentially segmental-shaped end of a second body, the bodies being designed to have a movement imparted to them in an axial direction towards the cylindrical section when torsional tightening movements are imparted to the bolt connection.

9. The device according to claim 1, wherein at the end of the axle there is a projecting section surrounded by a guide bevel formed on the circumference, in which section the head for the hole is countersunk.

* * * * *